Oct. 19, 1943.   C. SAURER   2,332,264
MOTOR SUPPORT
Filed Nov. 26, 1940   2 Sheets-Sheet 1
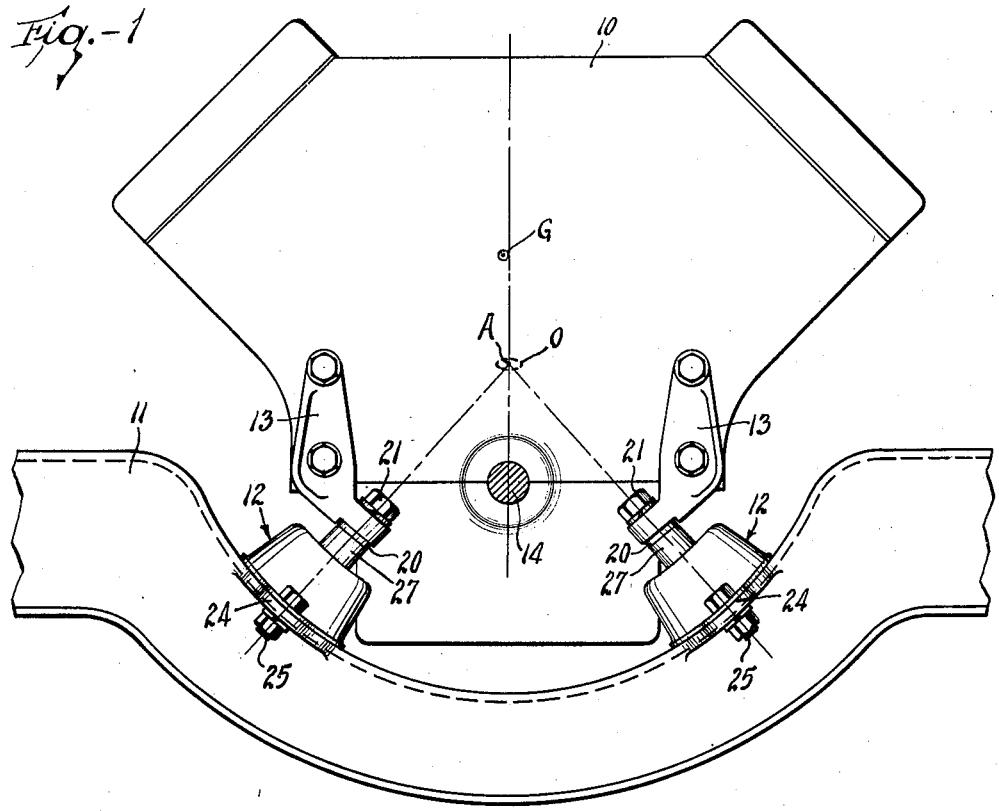
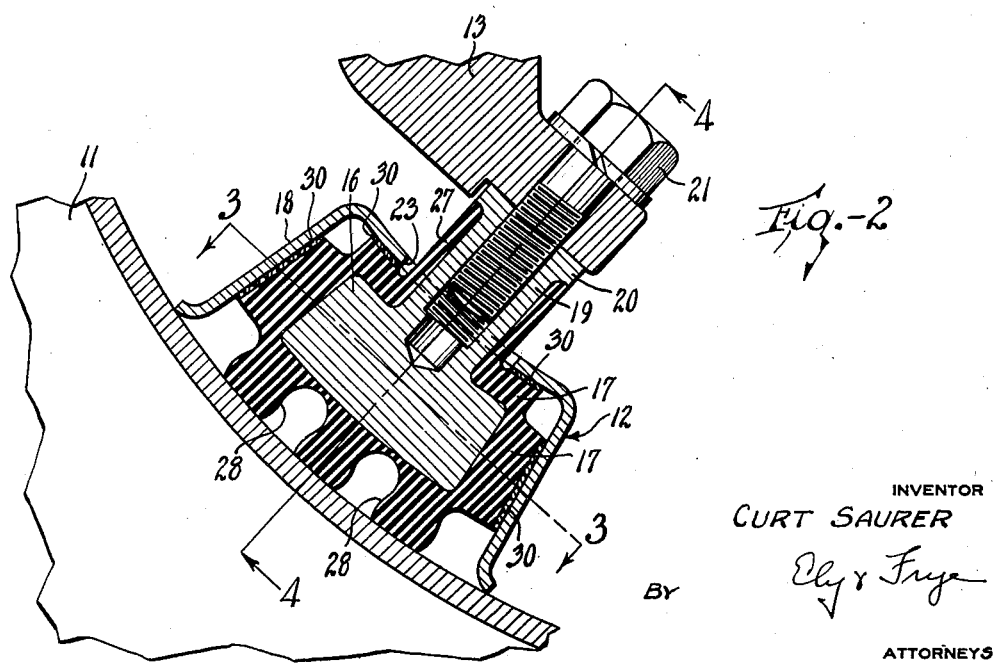
INVENTOR
CURT SAURER
BY
ATTORNEYS

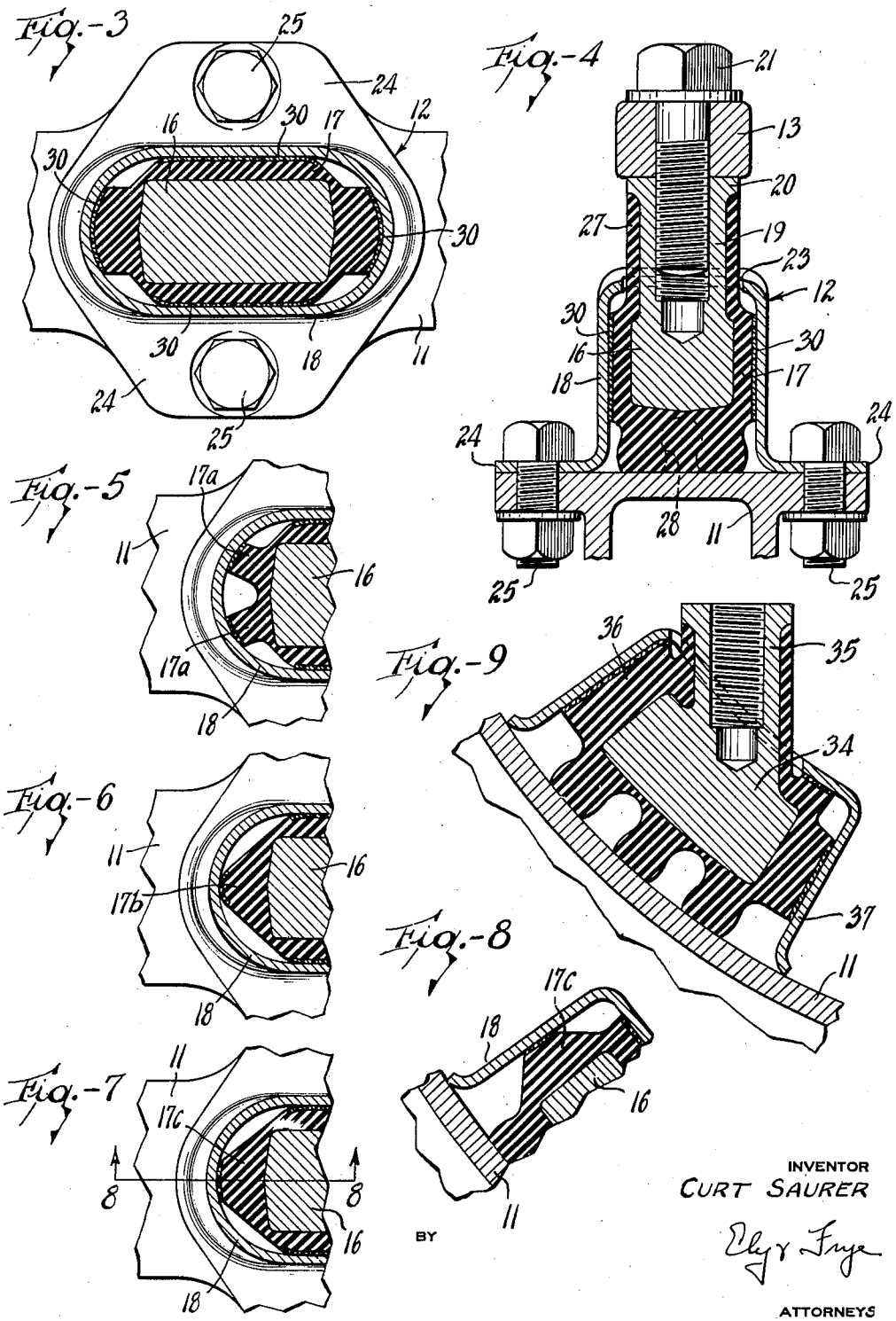

Patented Oct. 19, 1943

2,332,264

UNITED STATES PATENT OFFICE 2,332,264

MOTOR SUPPORT

Curt Saurer, Akron, Ohio

Application November 26, 1940, Serial No. 367,173

3 Claims. (Cl. 248—7)

This invention relates to supports for the motors of motor vehicles, and more especially it relates to motor supports of the character mentioned that comprise resilient material as a means for damping motor vibration and impeding its translation to the frame of the vehicle.

A vehicle motor of the internal combustion type operating in a moving vehicle sets up numerous vibrations, such as torque reaction that is parallel to the axis of the motor, vertical and horizontal vibrations due to bound and rebound of the vehicle, and a gyratory vibration arising from the rotation of the crank shaft of the motor. The said gyratory movement has an axis that is substantially parallel to the centerline of the crank shaft and is located two or three inches above the crank shaft, between the latter and the center of gravity of the motor.

It will be apparent that every part of the vehicle motor is subject to gyratory movement, and the extent or magnitude of such movement varies in different regions of the motor due especially to pendulum action of the motor. Accordingly, the term "axis of gyration" as used herein is intended to designate the imaginary line or axis about which the orbit of gyration is of smallest extent, that is, the "axis of gyration" is the axis of minimum gyration. The location of said axis is the result of several factors, which include the height of the motor, the location of the center of its mass, the gyratory action of the crank shaft, and the location of fly wheel or wheels, but its location generally is from 2 to 3 inches above the crank shaft, depending upon the particular characteristics of the motor. Said axis of gyration is substantially parallel to the centerline of the crank shaft, and will not deviate more than three degrees therefrom as the result of fly wheel, gear case, and other heavy members that may be located at one end of the motor. The term "natural axis of gyration" is used herein to designate the axis of minimum gyration when the vehicle motor is considered as a floating body without support.

Numerous resilient motor supports have been devised for the purpose of damping motor vibration, among which may be mentioned those that support the motor on an axis that extends through its center of gravity. Such supports, however, have not been entirely successful in accomplishing the result for which they were designed, experience having shown that motor supports positioned in determinate relation to the axis of gyratory movement set up by the crank shaft to be more effective in suppressing gyratory vibration. However, it is not possible to suspend a motor of present day design on this hypothetical center of gyration, and it is to the solution of this problem that this invention primarily is directed.

The chief objects of the invention are to improve the riding qualities of motor vehicles and to contribute to the comfort of the passengers thereof; and to improve the mechanical qualities of motor vehicles by reducing the amount of engine vibration transmitted to the frames and bodies thereof. More specifically the invention aims to provide motor supports so constructed and arranged as to enable the motor to vibrate in an orbit about the aforesaid center of gyration, yet strongly to resist vibration in a fore and aft direction. Other objects will be manifest as the description proceeds.

Of the accompanying drawings:

Figure 1 is a front elevation of a V-type vehicle motor and its supporting frame, and a pair of improved resilient motor supports operatively interposed between said motor and frame;

Figure 2 is a longitudinal section, on a larger scale, of one of the improved motor supports shown in Fig. 1;

Figure 3 is a section on the line 3—3 of Fig. 2;

Figure 4 is a section on the line 4—4 of Fig. 2;

Figures 5, 6 and 7 are fragmentary sectional details of modified end-constructions of the resilient element of the motor support;

Figure 8 is a section on the line 8—8 of Fig. 7; and

Figure 9 is a longitudinal section through a resilient motor support of somewhat modified construction.

Referring first to Fig. 1 of the drawings, there is shown a vehicle motor 10 of the so-called V-type, a cross member 11 of the vehicle frame for supporting the front end of the motor, and a pair of improved resilient motor supports, each designated as a whole by the numeral 12, operatively interposed between said motor 10 and said frame member 11, said supports being mounted directly upon the frame member and secured to the motor by means of respective angular brackets 13 attached to the latter. Indicated on the motor 10 is its center of gravity G, the same being substantially in the position that obtains when the motor is idling, that is, operating at a speed of 8 miles an hour or less. Also indicated on the motor 10 is the axis A about which the motor gyrates when operating at normal driving speed of 40 miles an hour or more, and shown by a broken line O about the axis A is the orbit of gyration of the motor under impetus of the rotating crank shaft which is designated 14, said orbit being of elliptical shape. As previously stated, the resilient supports 12 are mounted upon the cross member 11, and at the points of attachment of said supports said surface of said cross member is arcuately formed on radii that have a common axis at the center of gyration A.

As is best shown in Figs. 2, 3 and 4, each of the resilient supports 12 comprises a metal core structure 16 that is connected to a motor bracket 13, a body of resilient rubber composition 17 enveloping said core and bonded thereto, as by vulcanization, and a hollow metal cage or shell 18 enclosing the rubber body 17 and secured to the cross member 11. The metal core 16 is a six-sided structure of greater length than width, with arcuate upper and lower surfaces that are concentric with the axis A, and with end faces disposed radially with relation to said axis A. The upper longitudinal face of the core 16 is formed with a projecting stem 19 that is disposed radially of the axis A, and has its free end formed with a circumferential flange 20. The stem 19 is axially threaded at its free end to receive a cap screw 21 by means of which the support is connected to the motor bracket 13.

The metal cage or shell 18 is a hollow structure having an open bottom, and having a top that is centrally apertured at 23, which aperture is somewhat larger in diameter than the stem-flange 20. The lateral walls of the cage are parallel to each other and the ends of the cage are arcuate or rounded. The bottom margin of the cage is flared slightly outwardly, as shown in Figs. 1 and 2, and is arcuately shaped in a longitudinal direction concentrically of the axis A. The top wall of the cage is similarly arcuately shaped, and the respective end walls of the cage are disposed radially with relation to said axis. Thus the cage is adapted to seat flush upon the concave upper face of the cross member 11, to which member it is secured. For securing the cage to said cross member, the bottom margin of the cage is formed with a pair of laterally projecting ears 24, 24 that are engaged by bolts 25 extending through lateral flanges locally formed on said cross member, as is best shown in Fig. 4.

The rubber body 17 of the mounting completely encases the entire metal core 16, said body having a portion 27 that projects through the aperture 23 of the cage, said portion surrounding the stem 19 and being of the same outside diameter as the flange 20 of the latter. The rubber body is of greater radial thickness below the core 16 than above it, with the result that said core normally is disposed nearer the top of the cage 18 than the bottom thereof. The main body of the rubber structure 17 extends from one lateral wall of the cage 18 to the other and from end to end thereof only in the major portion of the medial region of the cage between the top and bottom thereof, thus leaving ample unoccupied space within the cage into which the rubber may move when deformed and displaced by various loads that may be imposed thereon. The rubber body is of greater thickness at the ends of the core 16 than at the sides thereof, as is evident by comparison of Fig. 2 with Figs. 3 and 4. A portion of the rubber structure engages the top wall of the cage, about the aperture 23 therein, and a portion below the core 16 engages the confronting surface of the cross member 11. The latter portion is formed with a plurality of recesses 28, 28 that enable the rubber body readily to deform under pressure directed radially of the axis A. The height of the rubber body that is confined within the cage 18 is somewhat greater than the inside height of the cage, with the result that the rubber structure normally is under compressive stress in the direction of the axis of stem 19.

Those faces of the rubber body 17 that engage the cage 18 at the top, ends, and sides of the latter are provided with respective facings of friction material 30 that is vulcanized thereto. The said friction material preferably consists of square-woven fabric or heavy duck that is impregnated with a suitable lubricating material. Such material may consist of colloidal graphite suspended in castor oil, but other lubricants of a similar nature may be employed. The castor oil has no detrimental effect upon the rubber, it is not affected by temperatures of from minus 14 degrees to plus 150 degrees, and will continue to lubricate the friction material for the life of the vehicle. The lubricated friction material will not squeak, and it has no "break-away" action such as obtains in other friction materials, such as brake lining. Since the rubber body 17 is under compressive stress, the friction facings 30 are yieldingly urged against the inner faces of the cage 18 at all times.

The pressure of the friction facings 30 has a beneficial damping effect on the ability of the support to resist movement of the core 16 relatively of the cage 18 and cross member 11, by reason of the resistance of the rubber to compression, in any and all directions. Of especial importance is the fact that the operative elements of the support are arcuately shaped, and disposed concentrically of the axis of gyration A of the motor 10, with the result that the cores 16 of the supports have orbital movement under the impetus of the gyration of the motor, and the latter is enabled to gyrate in its normal orbit about axis A in opposition to the resistance of the rubber bodies 17, the latter offering uniform resistance to gyratory movement of the motor when said motor is in all positions of its orbit. Because the rubber bodies 17 are thinner at the sides of the core than at the ends thereof, vibration of the motor in a fore and aft direction is more strongly resisted. The arrangement is such that little if any vibration caused by gyratory movement of the motor is transmitted to the frame and body of the vehicle, more comfortable riding is assured, and the other advantages set out in the foregoing statement of objects are achieved.

As shown in Fig. 3, the end portions of the rubber body 17 are rounded concentrically of the rounded ends of the cage 18 so as to fit flush against the inner surface of the cage throughout a substantial area. In some cases however it may be desirable to reduce the resistance of the rubber body to orbital movement of the motor, and this may be accomplished readily by the use of rubber bodies having a smaller mass of resilient material disposed between each end of the core 16 and the adjacent end wall of the cage 18. In Fig. 5 the rubber body at the end of core 16 consists of a pair of diverging legs 17a, 17a. In Fig. 6 the end of the rubber body is laterally tapered to a relatively small terminal radius 17b that normally is in contact with the cage over a relatively small area. In Figs. 7 and 8 the rubber body shown has its end portion tapered on the sides and top and bottom to provide a truncated pyramid 17c that is in contact with the cage over a relatively small area at its smaller end.

The embodiment of the invention shown in Fig. 9 is essentially similar to those previously described, but is modified in a manner that enables the motor to be assembled with the supports by lowering it directly down upon them. Thus while the arcuate core 34 is disposed concentrically of the axis A of the motor, the stem 35 is disposed at such an angle to the core as to stand in vertical position when the support is mounted upon the cross member 11. The construction of the rubber body 36 and cage 37 also are modified to the extent made necessary by the vertical position of the stem. The motor, of course, is provided with brackets (not shown) that serve the same purpose as the brackets 13 of the first-described embodiment of the invention, said brackets being suitably modified in view of the vertical arrangement of the stems 35 of the supports.

Other modification may be resorted to without departing from the spirit of the invention, or the scope thereof as defined by the appended claims.

What is claimed is:

1. The combination which comprises an internal combustion engine, a support therefor, and a resilient support positioned between said motor and the first mentioned support, said resilient support comprising a cage secured to said first-mentioned support, a metal core secured to said motor, and a body of resilient material interposed between said cage and core, said elements of the resilient support being longitudinally arcuate about the natural axis of gyration of the motor and the end faces of the said elements being radially disposed with relation to said natural axis of gyration of the motor, whereby gyratory movement of the motor is uniformly opposed by the resistance of the resilient material to compression at all times.

2. A combination as defined in claim 1 including an engine attaching stem that extends from the concave side of the core and is disposed radially of the axis about which the curved surfaces of the resilient support are generated.

3. A resilient support adapted to be interposed between a supporting structure and a supported structure, said support comprising an elongated metal cage attachable to said supporting structure, an elongated metal core positioned within said cage and centrally formed with a stem that projects therefrom for attachment to said supported structure, a body of rubber in said cage surrounding said core and maintained under compressive stress by said cage, said cage and core being concentrically arcuate in a longitudinal direction about an axis disposed exteriorly of the structure and transversely thereof whereby gyratory movement of the core is opposed by the resistance of the rubber body to compression uniformly in all regions of its orbit of gyration, said stem being vertically disposed and located entirely above the central region of the core, and being in non-radial relation to the axis about which the arcuate portions thereof are generated, and means for attaching the supported structure to the end of the stem.

CURT SAURER.